(12) United States Patent
Håkansson

(10) Patent No.: US 12,064,034 B2
(45) Date of Patent: Aug. 20, 2024

(54) BAR FOR SUPPORTING A TABLE

(71) Applicant: ROL ERGO AB, Jönköping (SE)

(72) Inventor: Eskil Håkansson, Jönköping (SE)

(73) Assignee: ROL ERGO AB, Jönköping (SE)

( * ) Notice: Subject to any disclaimer, the term of this patent is extended or adjusted under 35 U.S.C. 154(b) by 212 days.

(21) Appl. No.: 17/615,094

(22) PCT Filed: Jun. 4, 2020

(86) PCT No.: PCT/EP2020/065434
§ 371 (c)(1),
(2) Date: Nov. 29, 2021

(87) PCT Pub. No.: WO2020/245248
PCT Pub. Date: Dec. 10, 2020

(65) Prior Publication Data
US 2022/0232975 A1     Jul. 28, 2022

(30) Foreign Application Priority Data

Jun. 5, 2019 (EP) .................................... 19178446

(51) Int. Cl.
*A47B 96/14*     (2006.01)
(52) U.S. Cl.
CPC ................................ *A47B 96/1466* (2013.01)
(58) Field of Classification Search
CPC .............. A47B 96/1466; A47B 96/145; A47B 96/1458; A47B 96/14; A47B 96/1475; F16B 7/182
USPC ......................................... 248/265, 260, 259
See application file for complete search history.

(56) References Cited

U.S. PATENT DOCUMENTS

| | | | | |
|---|---|---|---|---|
| 4,223,863 A | * | 9/1980 | Birman .................. | A47B 57/56 |
| | | | | 248/246 |
| 4,645,276 A | * | 2/1987 | Flavigny ............ | A47B 96/1475 |
| | | | | 108/107 |
| 5,673,741 A | * | 10/1997 | Cairns .................... | A47H 23/04 |
| | | | | 248/265 |
| 5,927,041 A | * | 7/1999 | Sedlmeier ................. | E04C 3/07 |
| | | | | 52/39 |
| 5,957,060 A | * | 9/1999 | Rosenband ............ | A47B 57/22 |
| | | | | 211/187 |

(Continued)

FOREIGN PATENT DOCUMENTS

| | | |
|---|---|---|
| EP | 0 172 111 A1 | 2/1986 |
| GB | 570 503 A | 7/1945 |

(Continued)

OTHER PUBLICATIONS

International Search Report and Written Opinion for PCT/EP2020/065434, mailed Jun. 29, 2021.

*Primary Examiner* — Bradley Duckworth
(74) *Attorney, Agent, or Firm* — MARSHALL, GERSTEIN & BORUN LLP

(57) ABSTRACT

A bar for supporting a table, includes an angle shaped bar having a longitudinal extension, including a first side and a second side extending perpendicular relative each other, at least one first hole through the first side of the angle shaped bar, adapted for connecting two bars together longitudinally so as to form a longer bar, a ridge, extending along the longitudinal edge of the first side of the angle shaped bar, wherein the ridge is adapted to longitudinally limit movement of connected bars.

12 Claims, 6 Drawing Sheets

(56) References Cited

U.S. PATENT DOCUMENTS

| | | | |
|---|---|---|---|
| 7,673,841 B2* | 3/2010 | Wronski | F21S 8/026 |
| | | | 248/200.1 |
| 8,534,752 B2* | 9/2013 | Martin | A47B 13/081 |
| | | | 108/50.11 |
| 8,714,864 B2* | 5/2014 | Wojtowicz | A47B 87/0215 |
| | | | 403/109.8 |
| 10,182,651 B2* | 1/2019 | Jost | A47B 96/14 |
| 11,047,510 B2* | 6/2021 | Juzak | B05B 15/62 |
| 11,391,038 B2* | 7/2022 | LeBlang | E04B 1/2604 |
| 2003/0005517 A1* | 1/2003 | Randolph | E03C 1/021 |
| | | | 4/695 |
| 2017/0238710 A1* | 8/2017 | Tsai | A47B 57/34 |
| 2019/0239648 A1* | 8/2019 | Hunter | A47B 96/06 |
| 2021/0277665 A1* | 9/2021 | Bilge | E04F 13/081 |

FOREIGN PATENT DOCUMENTS

| | | |
|---|---|---|
| WO | WO-02/094061 A1 | 11/2002 |
| WO | WO-2011/000432 A1 | 1/2011 |

\* cited by examiner

BAR FOR SUPPORTING A TABLE

TECHNICAL FIELD

The present disclosure relates to a bar for supporting a table, and especially to an angle shaped bar for supporting a table.

BACKGROUND

In some furniture configurations, such as in tables or desks, horizontal or vertical bars are attached to provide stable constructions. Depending on the size of the table or desk, the attached horizontal or vertical bars need to be of a length appropriate to the table or desk. In order to produce longer bars, it is common to connect multiple bars. It is mostly not desirable to weld the bars directly to each other due to transportation issues. It is also not desirable to weld the bars directly to each other for ease of reconfiguration without altering at least one of the bars. Instead some kind of attachment arrangement is provided between the bars. In one known solution, the horizontal or vertical bar(s) need(s) to be made at a specific length or configuration, so as to match the table(s) or desk(s). This requires one set of tools per specific length or configuration, which is costly and time-consuming.

Therefore, it is desirable to have a horizontal or vertical bars which may be attached to each other at varying lengths and that are quicker and easier for a user to connect.

SUMMARY

It is an object of the present inventive concept to provide an improved solution that alleviates the mentioned drawbacks with present devices. Furthermore, it is an object to provide an angle shaped bar, adapted for connecting two bars together longitudinally so as to form a longer bar.

This is provided in a first aspect of the inventive concept by a bar for supporting a table, wherein the table may comprise an angle shaped bar. The angle shaped bar may have a longitudinal extension, which may comprise a first side and a second side extending with an angle relative each other. The bar may comprise at least one first hole through the first side of the angle shaped bar, which may be adapted for connecting two bars together longitudinally so as to form a longer bar. Further, the bar comprises a ridge, which extends along a longitudinal edge of the first side of the L shaped bar. The first side extends in a first plane, and the ridge comprises a first wall portion extending with and angle to the first plane of between 20-60 degrees, and a second wall portion extending with an angle to the first plane. The first wall portion and the second wall portion connect to each other with an angle of between 80-100 degrees.

The angle shape of the bar may increase the stability. It may prevent the bar from bending or skewing when put under pressure, which may arise when the bar is used for supporting a table. The at least two first holes may be configured to be connected with fastening means, such as screws, nuts or screw nuts. The at least two first holes may be scored. The bar may comprise any number of ridges, such as one, two, three, or more. The ridge(s) may extend along the entire longitudinal edge of the first side of the angle shaped bar. However, the ridge(s) may comprise a number of ridge portions which may extend along a longitudinal edge of the first side of the angle shaped bar. The ridge may hinder any movement of two connected bars, except from movement along the longitudinal extension of the bar and upwards movement, perpendicular to the first side of the bar. The ridge(s) may increase the stability of connected bars. The ridge(s) may alleviate the strain on the means of connecting two bars. Hence, the structure of the bar with an angled shape and the ridge may provide a stable construction when arranging two bars together, and the first holes may be used to fix the two bars together. The angle shape, the ridge and the first holes thereby may provide a flexible bar which may be easy and quick to assemble. By angle shaped bar it may be meant a bar comprising at least two sides extending along the longitudinal extension of the bar, and which sides are in an angle relative each other. The angle between the two sides may be between 10-170 degrees, preferable 45-135 degrees, more preferably 60-120 degrees, most preferably between 80-100 degrees. In one embodiment, the two sides may be perpendicular relative each other.

The ridge may comprise two wall portions which may be interconnected and arranged with an angle relative to each other. The angle between the two wall portions may be between 1°-179°, preferably between 30°-150°, more preferably between 80°-100°, and most preferably about 90°. The first wall portion may be angled towards the plane extension of the first side of the angle shaped bar with an angle of between 20°-60°, preferably between 35°-55°, more preferably about 45°. The wall portions of the ridge may be arranged relative each other and relative the first side of the angle shaped bar so as to form a triangle. In one embodiment an equilateral triangle. The first wall portion may extend with an angle to the plane of the first side such that the first wall portion extends away from said plane. The second wall portion being connected to the first wall portion with an angle of 80-100 degrees may extend in a direction towards the plane of the first side. The second wall portion may end when reaching the plane of the first side. The end edge of the second wall portion may constitute the longitudinal edge of the first side.

The first side may have a plane portion extending in said plane of the first side. The plane portion may connect to the first wall portion of the ridge with said angle of 20-60 degrees. The plane portion may extend between the connection to the first wall portion and a connection to the second side of the angle shaped bar.

In one embodiment, the first and second sides may extend perpendicular relative each other along the longitudinal extension of the angle shaped bar.

In one embodiment, the bar may comprise at least three first holes. The at least three first holes may be adapted for connecting two bars together longitudinally so as to form a bar of a length. The length may depend on which first holes are used for connecting the two bars.

There may be one first hole arranged closer to a longitudinal end of the first side of the bar than the rest of the first holes, which may be arranged closer to the other longitudinal end of the first side of the bar. The one first hole of one bar may be adapted to be connected to one of the holes arranged closer to the other longitudinal end of the first side of another bar. The length of the connected bars may be dependent on which combination of first holes are connected. There may be any number of first holes arranged on a first side of the bar, such as three, four, five, six, seven, or more. The combination of first holes, adapted for connecting two bars together longitudinally, and a ridge, adapted to longitudinally limit movement of connected bars, may increase the stability of the connected bars and the connection of the bars.

The at least three first holes may be used for connecting the two bars at different lengths. Thereby, the at least three first holes may be configured to form a connected bar of varying lengths. A connected bar of a preferred length may comprise any number of connected bars. The length of a connected bar may be depending on which first hole of a bar and which first hole of another bar that are connected. Hence, only one sort of bar may need to be produced, which may reduce production time and cost.

In another embodiment, the first and second wall portions of the ridge may connect to each other with an angle of 90 degrees.

In a further embodiment, the ridge may be arranged at the longitudinal edge of the first side of the angle shaped bar. The longitudinal edge of the ridge may be the longitudinal edge of the first side of the angle shaped bar. The ridge may bend upwards from the plane of the first side of the angle shaped bar at an angle, and bend downwards at a bigger angle, such that the ridge ends at the same level as the first bend. The ridge may comprise a third bend, such that the longitudinal edge of the ridge is not the longitudinal edge of the first side of the angle shaped bar. Hence, on both transversal sides of the ridge, the bar may extend in the plane of the first side of the angle shaped bar.

In one embodiment, the bar may comprise at least one ridge hole and a lip. The at least one ridge hole may be arranged in connection with the ridge. Further, the at least one ridge hole may be arranged for guiding a user when connecting two bars together.

The at least one ridge hole and the lip may reduce the time it takes, or make it easier for a user to connect two bars. The ridge hole may be arranged along the ridge. The ridge hole may be configured as indexes, which may ease and/or hasten connection of two bars by a user. There may be any number of ridge holes, such as one, two, three, four, five, or more. The ridge hole and the lip may be arranged at a distance from each other.

In one embodiment, the lip may protrude from the first side. The lip may follow the plane of the first side of the bar. The lip may alternatively follow a plane of the ridge. The lip may have a rectangular shape, which may have rounded corners. The lip may have a triangular shape, which may have a rounded tip. The lip may support a connection of two bars and/or the connected bar, which may increase the stability of two connected bars. In one embodiment, the bar may comprise more than one lip, such as two, three or four lips.

In a further embodiment, the lip may be arranged to be inserted into a ridge hole of a connecting bar. The bar may be configured to be connected when the lip is inserted into a ridge hole of a connecting bar. The lip may be seen through the ridge hole of a connecting bar. The lip may further guide a user when connecting two bars together. When two bars are arranged together, the lip on a first bar may extend into a ridge hole on a second bar.

In one embodiment, the lip may be configured to create a space between the two connecting bars, unless the lip is inserted into a ridge hole of the connecting bar.

The lip may prevent a connecting bar from abutting flatly against the bar, if the lip is not inserted into a ridge hole of the connecting bar. The lip may keep the bars in place relative to each other, which may increase the stability of connected bars and/or the connection of bars. By creating a space between the two connecting bars, the lip may further guide a user when connecting two bars, which may reduce the time it takes a user to connect two bars.

In one embodiment, the ridge hole and the lip respectively may be arranged at the angle between the first wall portion and the plane of the first side. The first side may have plane portion extending in said plane. The ridge hole and the lip may thereby be arranged at the angle between the first wall portion and the plane portion. The lip may extend in the plane of the first side. The lip may extend in the plane of the first side from the plane portion of the first side beyond the angle between the plane portion and the first wall portion. An opening may be formed in the first wall portion at the location of the lip. The ridge hole may be arranged at the connection between the plane portion of the first side and the first wall portion. When arranging two bars together, the lip of a first bar may extend into the ridge hole of a second bar while the two ridges of the two bars abut each other.

In one embodiment, a distance between the ridge hole and the lip may correspond to a distance between two first holes. The ridge hole and the lip may be arranged such that when a connection is made between two bars, the lip of one bar aligns with the ridge hole of another bar. When aligning a first hole of a bar to a first hole of another bar, the ridge hole of a bar may align with the lip of another bar.

In one embodiment, the ridge may be used fasten other items to the bar, such as a control box or a cable holder. Such item may be snap fastened to the ridge.

In a further embodiment, the bar may comprise at least one second hole arranged through the second side of the angle shaped bar. The at least one second hole may be arranged for fastening the bar to the underside of the table.

There may be any number of second holes, such as one, two, three, four, or more. The at least one second hole may have any geometrical shape, such as circular, rectangular, or rectangular with rounded corners. The geometrical shape may be characterized as elongated. The at least one second hole may be arranged to be connected to a table or desk with screws, screw nuts, nuts, nails, or staples. The bar may also be connected to a table or desk with glue. Connecting the bar to an underside of a table or desk may increase the stability and/or rigidity of the table or desk.

In one embodiment, the bar may comprise at least one third hole arranged at each distal end of the first side of the angle shaped bar. The at least one third hole may be configured for connecting the bar to a supporting member of a table or desk.

The at least one third hole may be adapted for connecting two bars together longitudinally so as to form a longer bar. A connection between two bars may be done with the use of two first holes, two first third holes, or one first hole and one third hole. The at least one third hole may be configured for connecting the bar to a leg or drawer of the table. The supporting member of the table or desk may be any kind of furniture. The bar may comprise connecting means, which may be configured for connecting the bar to a leg or surface of a table or desk. The connecting means may comprise at least one third hole, a latch, a bolt, or a socket. Connecting the bar to a supporting member of the table or desk may increase the stability and/or rigidity of the table or desk.

The bar may be configured for connecting the bar to a table or desk by means of the at least one second hole, the at least one third hole, or the at least one second hole and the at least one third hole. Connecting the bar to a supporting member of the table or desk and an underside of a table or desk may further increase the stability and/or rigidity of the table or desk.

In one embodiment, the bar may comprise at least one U-shaped hole on the first side of the angle shaped bar.

There may be any number of U-shaped holes, such as one, two, three, four, or more. The U-shaped holes may be evenly spaced along the first side of the bar. The U-shaped holes may reduce the weight of the bar. The U-shaped holes are not limited to a U-shape, and could be any geometrical shape, for example a V-shape, W-shape, O-shape or S-shape. The U-shaped holes may be adapted for fastening or mounting of a device.

In a further embodiment, the at least one U-shaped hole may be configured for supporting auxiliary devices.

Auxiliary devices may comprise cables, power devices, switches, baskets, or motors. There is often a need to support auxiliary devices, and by providing the bar with U-shaped holes the stability of such a support is increased.

In one embodiment, the first side of the angle shaped bar may comprise at least two first holes. The two first holes on a bar may be used when connecting to bars to form an extended bar.

In one embodiment, the angle shaped bar may be a L-shaped bar or a C-shaped bar. The L-shaped bar may be provided by the two sides of the bar being perpendicular relative each other. The C-shaped bar may be provided by the par comprising three sides, each with an angle relative to an adjacent side. In one embodiment, a C-shaped bar may be formed by three sides each being perpendicular to the adjacent side or sides.

According to a second aspect of the inventive concept, a method of connecting two angle shaped bars as in any of the preceding embodiments to each other to form an extended longitudinal bar may be provided. The method may comprise the steps of arranging a first angle shaped bar with its outer angle shaped surface on an inner angle shaped surface of a second angle shaped bar, arranging the ridge of the first angle shaped bar in a shaped engagement with the ridge of the second angle shaped bar, and fixating the two angle shaped bars to each other by a fastening means through one of the first holes of the first angle shaped bars and one of the first holes of the second angle shaped bar.

By such method, there may be provided a way of easily and quickly assembling a bar at a desired length by connecting two angle shaped bar. Such extended bar may further provide a rigid and stable bar in a desired length. The angle shaped bars may be bars according to any of the embodiments discussed above. In one embodiment, the angle shaped bars may comprise ridge holes as discussed above. The method may in such embodiment comprise a step of arranging the lip of one ridge hole of the first angle shaped bar into a ridge hole of the second angle shaped bar. Such step may be performed prior to the step of fixating the two angle shaped bars to each other using a fastening means. The fastening means may be a screw, bolt, rivet or the like. In one embodiment, the method may further comprise steps of connecting even more angle shaped bars to the first and second angle shaped bars in a corresponding way.

According to a third aspect of the invention, a table or desk is provided, which table or desk comprises at least one bar as in any of the embodiments above. In one embodiment, the table or desk may comprise at least two bars connected to each other, which may be connected by means of the method as in the embodiment above.

BRIEF DESCRIPTION OF THE DRAWINGS

The inventive concept will in the following be described in more detail with reference to the enclosed drawings, wherein.

DESCRIPTION OF EMBODIMENTS

Figure 1:
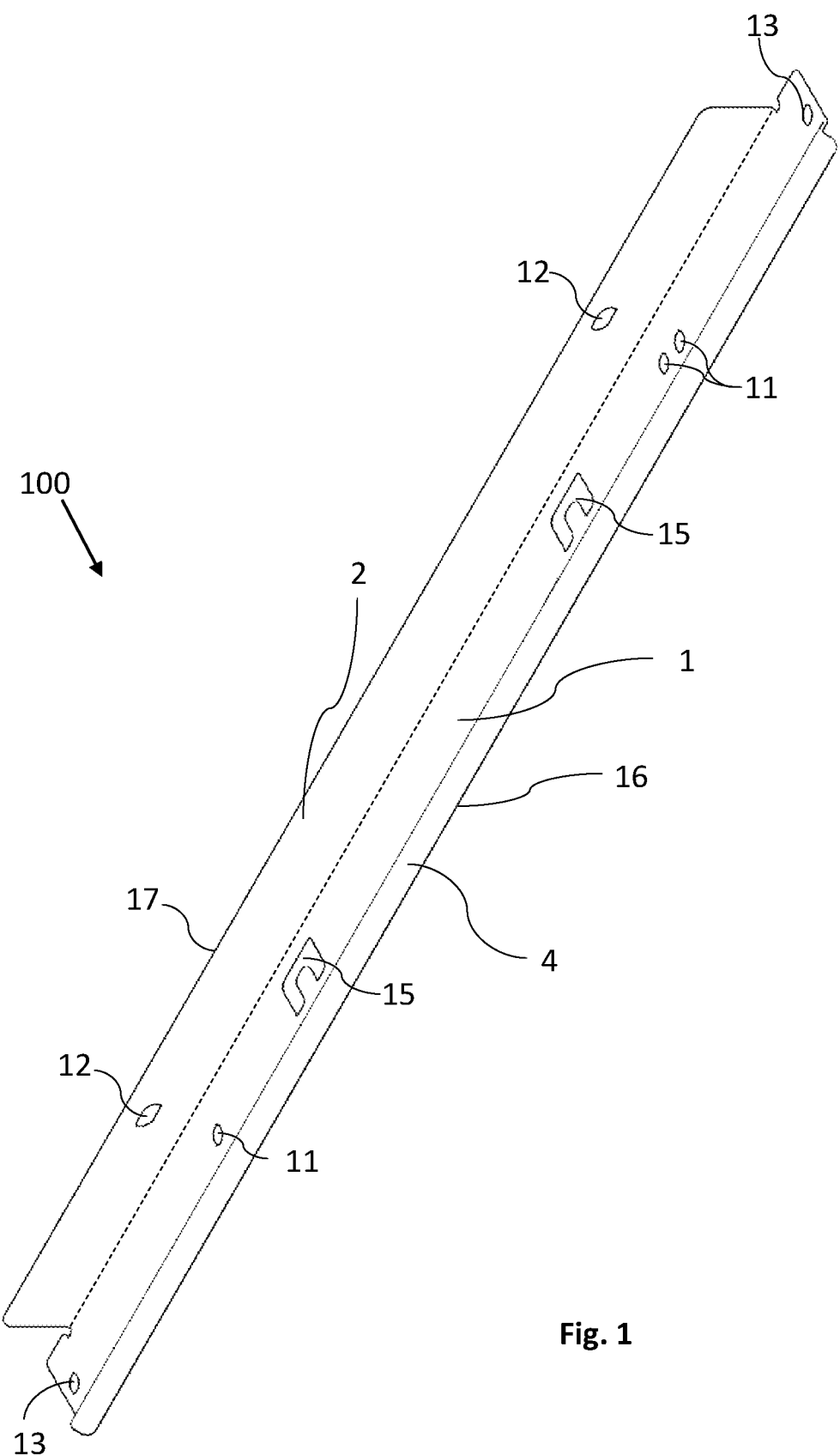
FIG. 1 shows a perspective view of a bar for supporting a table according to an embodiment of the inventive concept.

The present inventive concept will be described more fully hereinafter with reference to the accompanying drawings, in which preferred embodiments of the invention are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements.

FIG. 1 illustrates a bar 100 for supporting a table or desk. The bar 100 is L-shaped and has a longitudinal extension. The L-shaped bar comprises a first side 1 and second side 2 extending perpendicular relative each other. In the illustrated embodiment, L-shaped bar(s) are illustrated and discussed, but it is understood that all said about the illustrated embodiments apply equally to embodiments with other angle shaped bars, such as C-shaped bars, having at least two sides with an angle relative to each other, not necessarily a right angle.

The first side 1 and the second side 2 extend perpendicular relative each other in directions perpendicular to the longitudinal extension of the bar 100. Each of the first side 1 and the second side 2 has a longitudinal edge 16, 17, being edges the respective side extending along the longitudinal extension of the bar 100.

The bar 100 comprises three first holes 11, which are arranged through the first side 1 of the L-shaped bar. The bar 100 comprises a ridge 4, extending along the longitudinal edge 16 of the first side 1 of the L-shaped bar. The bar 100 further comprises two second holes 12, arranged through the second side 2 of the L-shaped bar. On each distal end of the first side 1 of the L-shaped bar, a third hole 13 is arranged. Further, the bar 100 comprises two U-shaped holes 15 on the first side 1 of the L-shaped bar.

The first holes 11 may be adapted for connecting the bar 100 to another bar longitudinally so as to form a longer bar. The ridge 4 is adapted to limit movement of connected bars relative each other. The second holes 12 may be configured for fastening the bar 100 to an underside of the table. The third holes 13 may be configured for connecting the bar 100 to a supporting member of a table or desk, or for connecting two bars.

Figure 2:
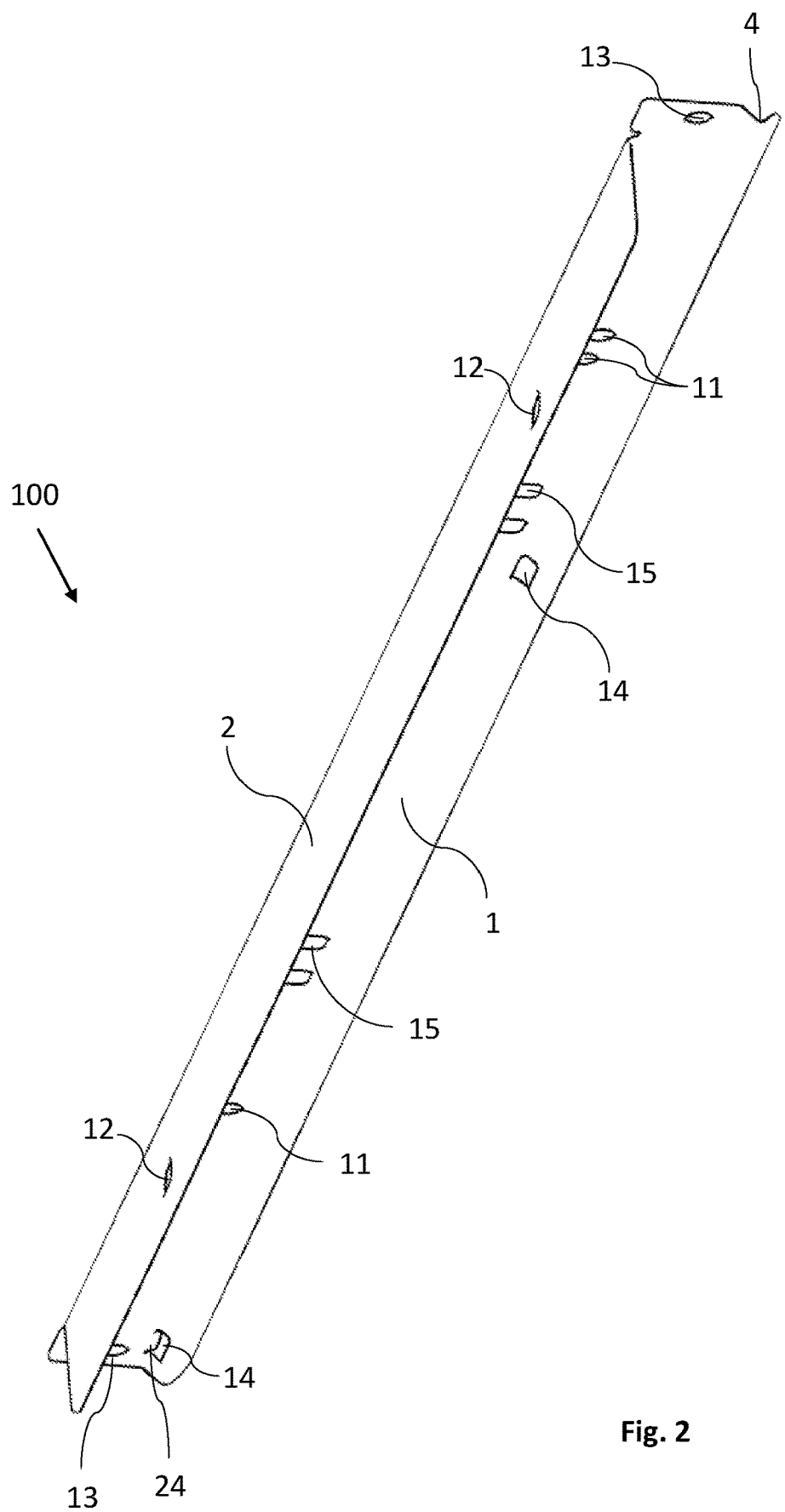
FIG. 2 shows a perspective view of a bar for supporting a table according to an embodiment of the inventive concept.

In FIG. 2 the bar 100 for supporting a table is illustrated in a rotated position, as compared to the illustration in FIG. 1. The bar 100 illustrated in FIG. 2 shows all the features shown in FIG. 1. Further, the bar 100 illustrated in FIG. 2 shows two ridge holes 14, arranged in connection with the ridge 4. One ridge hole 14 comprises a lip 24, which protrudes from the first side 1 of the L-shaped bar. The lip 24 extends in the plane of the first side 1.

The ridge holes 14 may be configured for guiding a user when connecting two bars together. The lip 24 may be arranged to be inserted a ridge hole 14 of a connecting bar, preferably a ridge hole 14 without a lip 24. The lip 24 may be configured to create a space between two connecting bars, unless the lip 24 is inserted into a ridge hole 14 of the connecting bar.

Figure 3A:
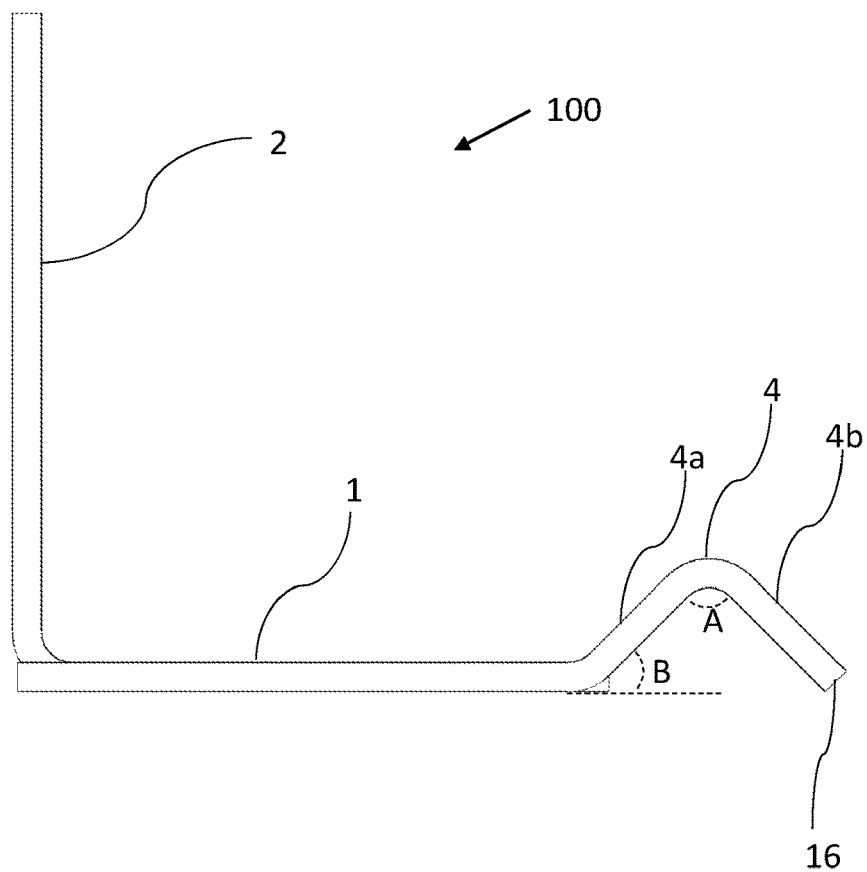
FIG. 3(a) shows a cross-sectional view of an L-shaped bar for supporting a table according to an embodiment of the inventive concept.
Figure 3B:
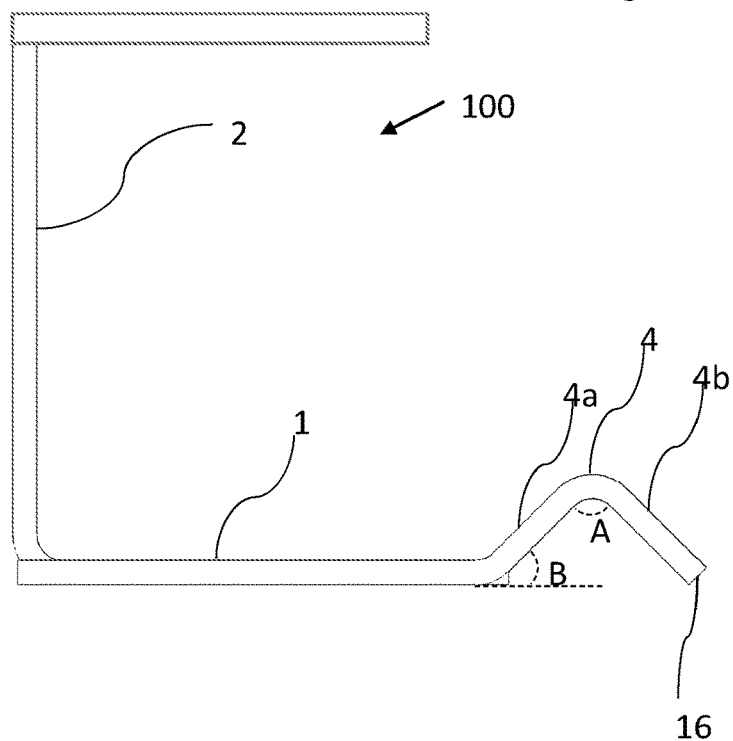
FIG. 3(b) shows a cross-sectional view of a C-shaped bar for supporting a table according to another embodiment of the inventive concept.

FIG. 3 illustrates a cross-sectional view of a bar 100 for supporting a table. The illustrated cross-section of the bar 100 shows an L-shaped bar. The shown L-shaped bar comprises a ridge 4 at the longitudinal edge of the first side 1 the L-shaped bar. The ridge 4 comprises a first wall portion 4a and a second wall portion 4b. The angle A of the bend of the ridge 4, i.e. the bend between the two wall portions 4a, 4b, is shown as approximately 90°. However, the angle A of the bend of the ridge may be any angle between 1° and 179°, preferably between 30°-150°, more preferably between 80°-100°, and most preferably about 90°. The first wall portion 4a may have an angle B to the plane of the first side 1 of between 20°-60°, preferably between 35°-55°, more preferably about 45°. The wall portions 4a, 4b of the ridge 4 is in the illustrated embodiment arranged relative each other and relative the first side 1 of the L-shaped bar so as to form an equilateral triangle. Hence, the second wall portion 4b may have an angle to the plane of the first side 1 being equal to the angle B. The end of the second wall portion 4b may constitute the longitudinal edge 16 of the first side 1.

The crease between the first side 1 and the second side 2 in the illustrated L-shaped bar has smooth curvature. The radius of the crease curvature is in no way limited by the shown illustration, and may be smaller or greater than shown.

Figure 4:
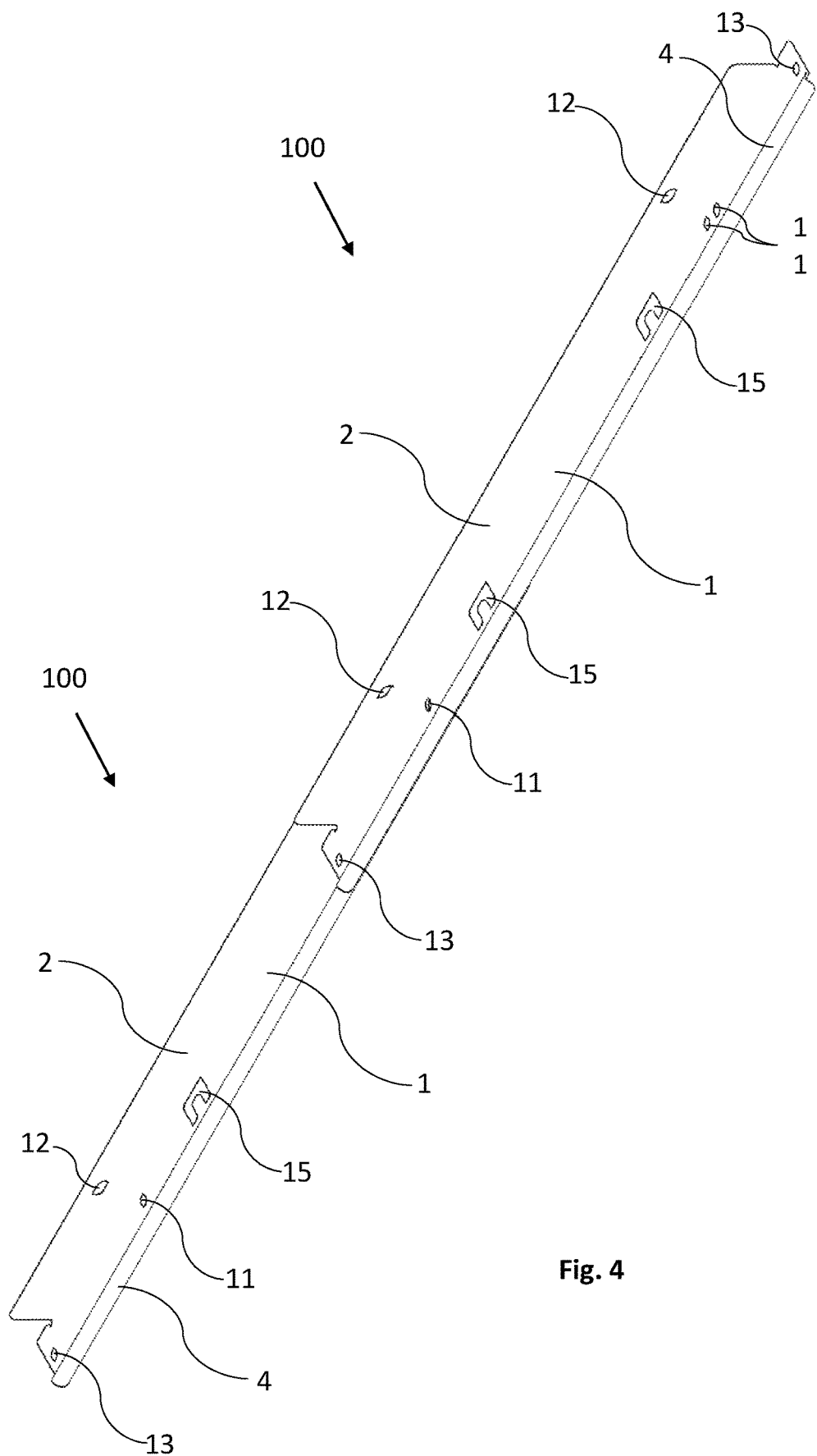
FIG. 4 shows a perspective view of two connected bars for supporting a table according to an embodiment of the inventive concept.

FIG. 4 illustrates an arrangement of two bars 100 for supporting a table or desk, arranged to be connected. Each of the two bars 100 comprise all features as shown in FIG. 1. The right bar 100 is shown as placed on top of the left bar 100, such that the top surface of the left bar 100 is abutting the bottom surface of the right bar 100. The two bars are shifted longitudinally, such that the left-most first hole 1 of the right bar 100 is aligned with the right-most first hole not shown; see FIGS. 1 and 2 of the left bar 100.

Figure 5:
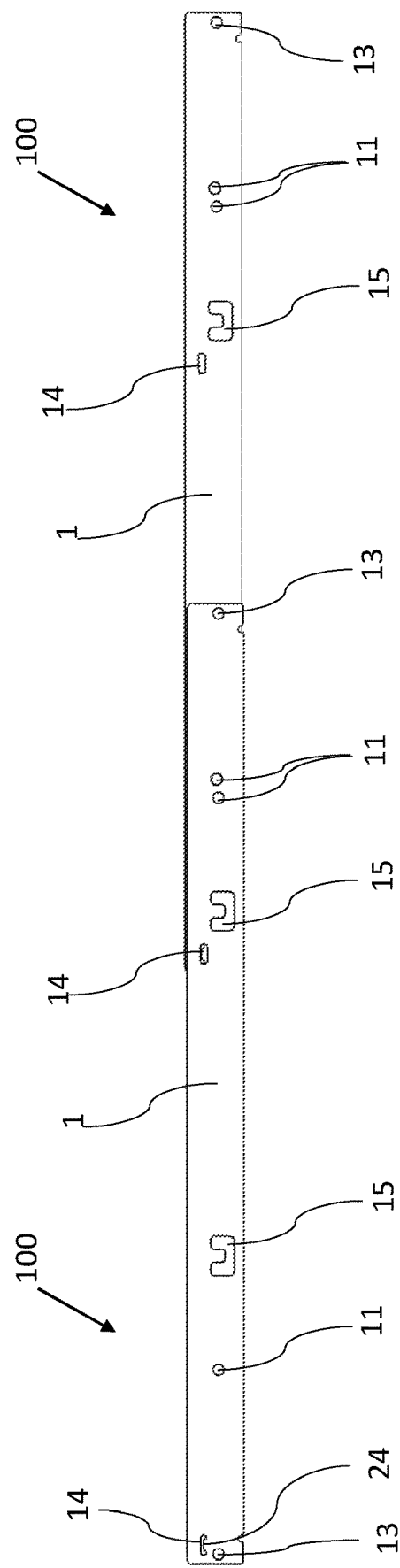
FIG. 5. shows a perspective view of two connected bars for supporting a table according to an embodiment of the inventive concept.
Figure 6:
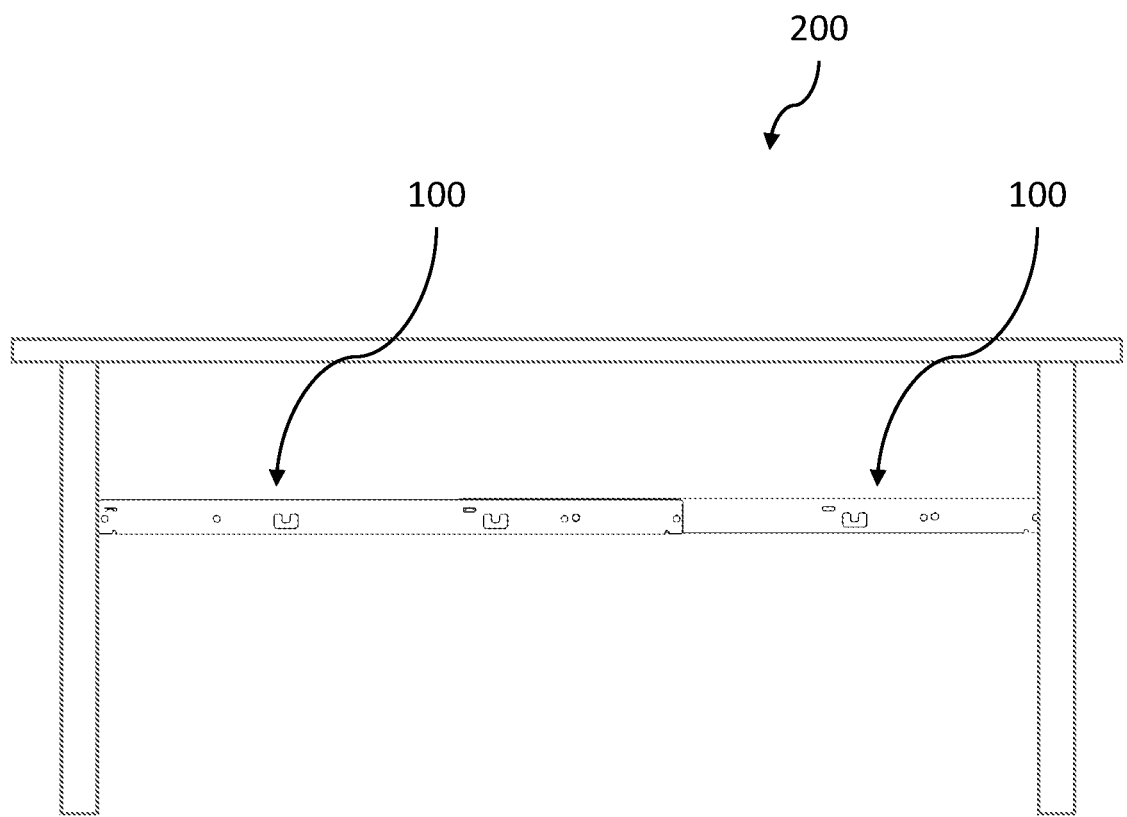
FIG. 6 shows an elevational view of a table or desk supported by two connected bars according to an embodiment of the inventive concept.

In FIG. 5 an arrangement of two bars 100 for supporting a table and arranged to be connected are illustrated in a rotated position, as compared to the illustration in FIG. 4. The left bar 100 and the right bar 100 illustrated in FIG. 5 are the left bar 100 and the right bar 100 illustrated in FIG. 4. The two bars 100 arranged to be connected in FIG. 5 shows all the features shown in FIG. 4. Further, the illustration in FIG. 5 shows each bar 100 comprising two ridge holes 14 arranged in connection with the ridge 4. The right-most ridge hole 14 of the left bar is aligned with the left-most ridge hole 14, which comprises a lip 24, of the right bar. Hence, the lip 24 of the right bar engages with the ridge hole 14 of the left bar.

In the drawings and specification, there have been disclosed preferred embodiments and examples of the inventive concept and, although specific terms are employed, they are used in a generic and descriptive sense only and not for the purpose of limitation, the scope of the inventive concept being set forth in the following claims.

The invention claimed is:

1. A table or desk, bar for supporting a table or desk comprising:

first and second bars, each of the first and second bars having an angle shape and being connectable to one another, each of the first and second bars further comprising:

a longitudinal extension and a first side and a second side extending at an angle relative to each other and perpendicular to a direction of the longitudinal extension, wherein each of the first and second bars comprises two longitudinal edges provided on the first and second sides, respectively, at least one first hole through the first side of each of the first and second bars adapted for connecting the first and second bars together longitudinally so as to form a longer connected bar;

a ridge extending along the longitudinal extension of each of the first and second bars at the longitudinal edge of the first side of the first and second bars, wherein the first side extends in a first plane, and the ridge comprises a first wall portion extending at an angle relative to the first plane of between 20-60 degrees, and a second wall portion extending at an angle relative to the first plane, and wherein the first wall portion and the second wall portion connect at an angle relative to each other of between 80-100 degrees, and wherein the first side comprises at least one ridge hole and a lip arranged in connection with the ridge such that the lip of the first bar protrudes from the first side and is configured to engage with a corresponding ridge hole of the second bar, such that the first bar is connected to the second bar at least in part by engagement of the lip of the first bar with the ridge hole of the second bar.

2. The table or desk according to claim 1, wherein at least one of the first and second bar comprises at least two first holes, arranged so as to form a bar of a desired length, wherein the desired length is dependent on which first holes are used for connecting the two bars.

3. The table or desk according to claim 1, wherein the lip of at least one of the first or second bar is configured to create a space between the first bar and the second bar prior to engagement between the lip and the corresponding ridge hole.

4. The table or desk according to claim 1, wherein the ridge hole and the lip respectively are arranged along a portion of the bar defined by the angle between the first wall portion and the plane of the first side.

5. The table or desk according to claim 1, wherein a distance between the ridge hole and the lip of at least one of the first and second bar corresponds to a distance between two first holes.

6. The table or desk according to claim 1, wherein at least one of the first and second bar comprises at least one second hole arranged through the second side of the angle shaped bar, for fastening the bar to an underside of the table.

7. The table or desk according to claim 1, wherein at least one of the first and second bar comprises at least one third hole arranged at each distal end of the first side of the angle shaped bar, for connecting the bar to a supporting member of a table.

8. The table or desk according to claim 1, wherein the angle shaped bar of at least one of the first and second bar comprises at least two first holes.

9. The table or desk according to claim 1, wherein the angle shaped bar of at least one of the first and second bar is a L-shaped bar or a C-shaped bar.

10. The table or desk according to claim 1, wherein the ridges of the first and second bars are shaped so that the first surface of the first bar abuts the second surface of the second bar when forming the connected bar.

11. A method, comprising:
providing the table or desk of claim 1;
arranging the first bar with a bottom surface thereof on a top surface of the bar,
arranging the ridge of the first bar in a shaped engagement with the ridge of the second bar,
fixating the two bars to each other by one or more fasteners through one of the first holes of the first bar and one of the first holes of the second bar.

12. A table or desk comprising at least two bars for supporting the table or desk, each of the bars comprising:
an angle shaped bar having a longitudinal extension, comprising a first side and a second side extending with an angle relative each other, wherein the angle shaped bar comprises two longitudinal edges provided on the first and second sides, respectively,
at least one first hole through the first side of the angle shaped bar, adapted for longitudinally connecting the at least two bars together so as to form a longer connected bar;
a ridge, extending along the longitudinal extension of the angle shaped bar at the longitudinal edge of the first side of the angle shaped bar,
wherein the first side extends in a first plane, and the ridge comprises a first wall portion extending at an angle to the first plane of between 20-60 degrees, and a second wall portion extending with an angle to the first plane, and wherein the first wall portion and the second wall portion connect with an angle to each other of between 80-100 degrees, and
wherein the first side comprises at least one ridge hole and a lip arranged in connection with the ridge such that the lip of a first one of the bars is configured to engage with a corresponding ridge hole of a second one of the bars, and
wherein the lip of at least one of the first or second bar is configured to create a space between the first bar and the second bar prior to engagement between the lip and the corresponding ridge hole.

* * * * *